(12) United States Patent
Carmichael et al.

(10) Patent No.: US 8,918,293 B2
(45) Date of Patent: Dec. 23, 2014

(54) FLOW METER

(75) Inventors: Richard Quentin Carmichael, Huntley (GB); Roger Manley, Cheltenham (GB); Ben Frisby, Cheltenham (GB)

(73) Assignee: Spirax-Sarco Limited, Gloucestershire (GB)

( * ) Notice: Subject to any disclaimer, the term of this patent is extended or adjusted under 35 U.S.C. 154(b) by 621 days.

(21) Appl. No.: 13/061,378

(22) PCT Filed: Aug. 28, 2009

(86) PCT No.: PCT/GB2009/051089
§ 371 (c)(1),
(2), (4) Date: May 13, 2011

(87) PCT Pub. No.: WO2010/023484
PCT Pub. Date: Mar. 4, 2010

(65) Prior Publication Data
US 2011/0213573 A1   Sep. 1, 2011

(30) Foreign Application Priority Data
Aug. 29, 2008  (GB) .................................. 0815790.1

(51) Int. Cl.
*G01F 1/00* (2006.01)
*G01F 1/26* (2006.01)

(52) U.S. Cl.
CPC ....................................... *G01F 1/26* (2013.01)
USPC ................................. 702/47; 702/45; 702/50

(58) Field of Classification Search
CPC ............... G01F 1/20; G01F 1/26; G01F 1/34
USPC ........ 702/178, 33, 45, 47, 50; 73/861, 861.42
See application file for complete search history.

(56) References Cited

U.S. PATENT DOCUMENTS

| 3,287,971 | A |   | 11/1966 | Bahniuk |   |
| 4,197,809 | A | * | 4/1980  | Johnson | 116/275 |
| 4,716,771 | A | * | 1/1988  | Kane | 73/861.355 |
| 5,419,203 | A | * | 5/1995  | Carmichael | 73/861.58 |
| 5,698,793 | A |   | 12/1997 | Carmichael |   |
| 5,847,288 | A | * | 12/1998 | Hutchinson | 73/861.75 |

FOREIGN PATENT DOCUMENTS

| GB | 559915     | 7/1942  |
| GB | 1320878    | 6/1973  |
| GB | 2234075    | 1/1991  |
| JP | 2004-163231 | 6/2004 |
| WO | 00/66979   | 11/2000 |

OTHER PUBLICATIONS

International Search Report and Written Opinion in related International Patent Application No. PCT/GB2009/051089, dated Oct. 30, 2009. Search Report in related GB Patent Application No. GB0815790.1, dated Dec. 9, 2008.

* cited by examiner

*Primary Examiner* — Mischita Henson
(74) *Attorney, Agent, or Firm* — Banner & Witcoff, Ltd.

(57) ABSTRACT

A flow meter for monitoring fluid flow through a pipeline, the flow meter comprising a conduit having a fluid inlet and a fluid outlet for communication with respective sections of the pipeline; a target element positioned inside the conduit between the fluid inlet and the fluid outlet, the target element being mounted for resilient axial displacement under a pressure differential between the inlet and the outlet; an arm secured at an anchor point on one side of the conduit and extending radially across the conduit, the target element being coupled to the arm for applying a load to the arm, upon said axial displacement of the target element, so as to deflect the arm relative to the anchor point; a sensor arrangement for measuring deflection of the arm at a point on the opposite side of the applied load to the anchor point; and a processor configured for providing a signal representative of the steam flow through the conduit in response to said measured deflection.

20 Claims, 1 Drawing Sheet

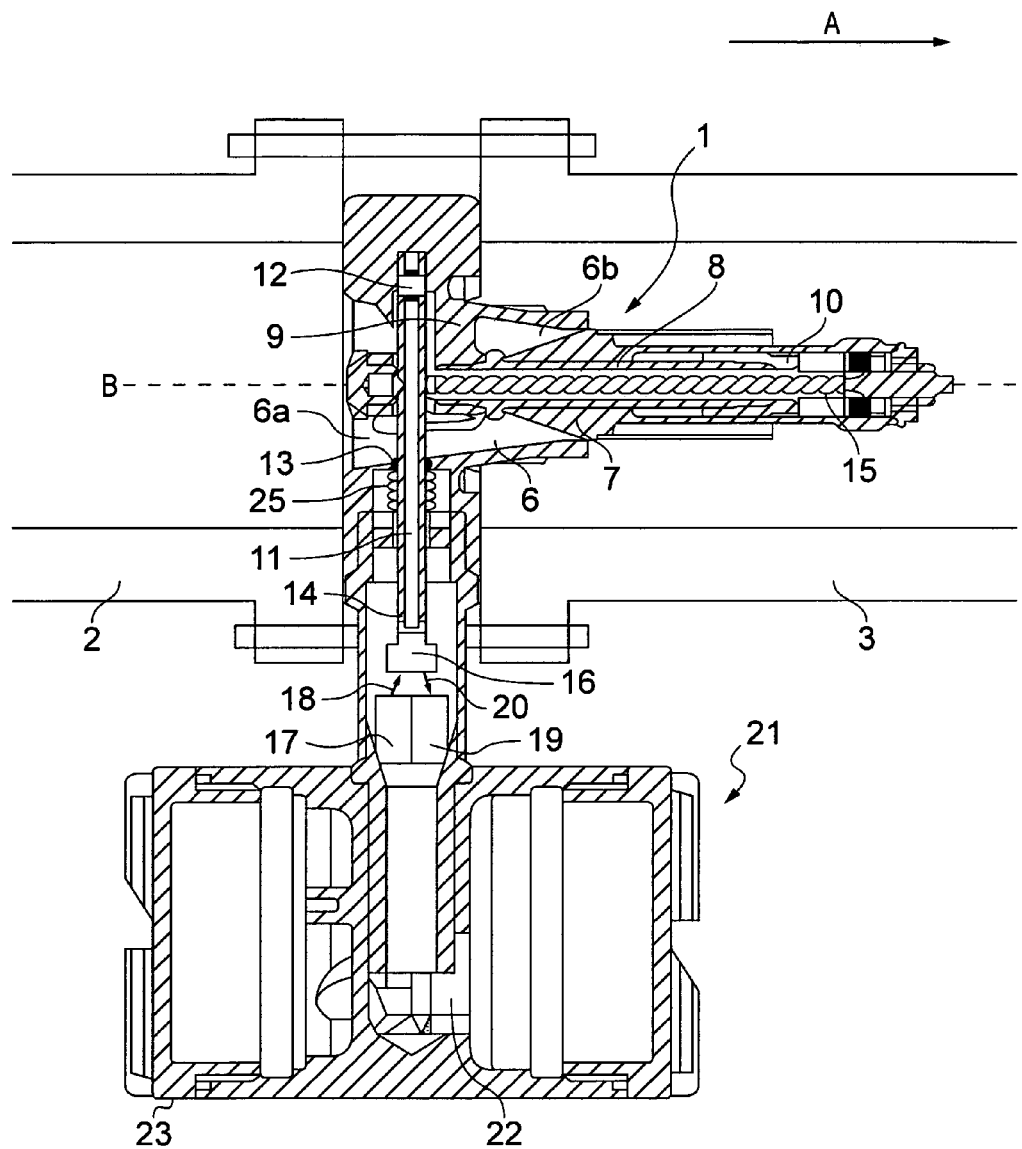

FLOW METER

CROSS REFERENCE TO RELATED APPLICATIONS

This is a U.S. National Phase Application under 35 U.S.C. §371 of International Application No. PCT/GB2009/051089, filed Aug. 28, 2009, which was published under PCT Article 21(2) and claims priority to GB Application No. 0815790.1, filed Aug. 29, 2008,the entire contents of which are incorporated herein by reference.

The present invention relates to a flow meter for determining the flow of fluid through a pipeline, for example the mass flow rate of steam through a steam pipeline.

Various types of flow meters exist for determining flow rates in pipelines.

In so-called "target meters", a target element is positioned in a conduit through which the steam flows. As steam is forced around the target element, changes in the velocity of the flow occur, resulting in a pressure differential between the upstream and downstream surfaces of the target element. The resulting force on the target element is related to the mass flow rate of the steam and, therefore, by measuring the force exerted on the target element the mass flow rate can be determined by calculation.

The target element is typically mounted on a radial support element and the force exerted on the target element is typically measured using a strain bridge comprising a series of strain gauges attached to the support element. Briefly, the force exerted on the target element tends to bend the support element, and the consequent induced strain in the support element is measured using the strain bridge.

It is an object of the present invention to seek to provide an improved flow meter.

According to the present invention there is provided a flow meter for monitoring fluid flow through a pipeline, the flow meter comprising: a conduit having a fluid inlet and a fluid outlet for communication with respective sections of the pipeline; a target element positioned inside the conduit between the fluid inlet and the fluid outlet, the target element being mounted for resilient axial displacement under a pressure differential between the inlet and the outlet; an arm secured at an anchor point on one side of the conduit and extending radially across the conduit, the target element being coupled to the arm for applying a load to the arm, upon said axial displacement of the target element, so as to deflect the arm relative to the anchor point; a sensor arrangement for measuring deflection of the arm at a point on the opposite side of the applied load from the anchor point; and a processor configured for providing a signal representative of the steam flow through the conduit in response to said measured deflection.

In this specification, references to axial and radial directions and orientations relate to the principal flow direction through the flow meter.

The flow meter may comprise a resilient biasing member acting between the target element and the arm.

In one embodiment, the arm is flexible and the anchor point is a flexure point.

The arm may extend through an aperture in the wall of the conduit such that a free end of the arm is located outside the conduit. In a particular embodiment, the free end of the arm is isolated from the internal pressure in the conduit by a sealing element providing a flexible seal around the arm.

The sensor arrangement may be located externally of the conduit, in proximity to the free end of the arm.

The sensor arrangement may be an optical sensor arrangement.

In one embodiment, the optical sensor arrangement comprises a reflecting element fixed to the arm, a light source for directing an incident beam of light onto the surface of the reflecting element, and a light detector for detecting the position of the resulting reflected beam of light relative to a reference position.

The target element may be a plug having an axially varying cross-section, wherein axial displacement of the plug thereby varies the flow cross section of the conduit. The axial profile of the plug may be such that there is a linear relationship between said deflection of the arm and the mass steam flow. For example, the plug may be cone-shaped.

The flow meter may further comprise a stop for limiting axial displacement of the target element.

The flow meter may further comprise a temperature sensor for density compensation.

An embodiment of the invention will now be described in more detail, by way of example, with reference to the accompanying drawing, in which:

FIG. 1 is a cross-sectional side view of a flow meter installed in steam pipeline.

A flow meter 1 is shown in FIG. 1, installed in-line in a steam pipeline between corresponding pipeline sections 2, 3.

The flow meter 1 is clamped between respective flanges on the pipeline sections 2, 3, which are bolted to one another in conventional manner, and defines a conduit 6 that fluidly connects the pipeline sections 2, 3.

The portion of the flow meter 1 clamped between the pipeline sections 2, 3 thus effectively forms an interposing pipeline section between the pipeline sections 2, 3. In use, fluid flows from the pipeline section 2 and into the conduit 6 via an inlet 6a, and then from the conduit 6 into the pipeline section 3 via an outlet 6b. Thus, in FIG. 1 the principal direction of steam flow through the steam pipeline is to the right, along the direction A.

In this case the conduit 6 has a variable cross-section, being tapered along the direction A so that the outlet 6b has a smaller cross-sectional area than the inlet 6a. The conduit may, however, have a generally uniform cross-section.

A target element in the form of a generally conical plug 7 provides a variable restriction to the flow cross-section of the outlet 6b. The plug 7 is mounted for axial sliding movement on a hollow shaft 8 supported on a fixed, central hub 9 within the conduit 6 and extending downstream from the hub 9 along the central axis B of the conduit 6.

A stop 10 is fixedly mounted on the downstream end of the shaft 8 to limit sliding movement of the plug 7 in the downstream direction.

An arm 11 extends radially across the conduit 6, through a clearance hole in the hub 9. The arm 11 is fixedly secured to the wall of the conduit 6 at an anchor point, specifically a flexure point 12 in this case, and extends through an aperture 13 in the wall of the conduit 6, opposite the flexure point 12, terminating in a free end 14 outside the conduit 6.

The arm 11 is coupled to the plug 7 by means of a resilient biasing element, in this case a coil spring 15 acting under tension which runs along the axis B, inside the hollow shaft 8, between the arm 11 and the plug 7. Thus, axial displacement of the plug 7 applies a load to the arm 11 (via the spring 15) which causes a respective deflection of the free end 14 of the arm 11 relative to the flexure point 12. At the same time, the arm 11 (notably the flexure point 12) resists such radial deflection and therefore tends to axially bias the plug 7 towards the position shown in FIG. 1.

The flow meter 1 incorporates a sensor arrangement for detecting the degree of deflection of the arm 11, in this case an optical sensor arrangement.

The optical sensor arrangement in the flow meter 1 comprises a reflecting element in the form of a mirror 16, which is fixed to the free end 14 of the arm 11, a light source 17 in close proximity to the mirror 16 for directing an incident beam of light 18 onto the mirror 16 and a detector 19 in close proximity to the mirror 16 for detecting the corresponding reflected beam of light 20 from the mirror 16.

The light source 17 may be a laser, or any other suitable light source.

The detector 19 may be any detector suitable for detecting the position of the reflected beam 20, at the detector 19, relative to a reference position. For example, the detector may comprise a photo-detector array such as a CCD array or an Active Sensor Pixel (APS) array. Any other suitable detector may alternatively be used.

The light source 17 and detector 19 are in turn operably connected to suitable control and process electronics, indicated generally at 21, including a processor 22 (indicated only very schematically in FIG. 1) for receiving an input signal or signals from the detector 19.

The light source 17, detector 19 and electronics 21 are each fixedly mounted within a "mallet-shaped" housing 23 supported on the wall of the conduit 6 around the aperture 13, with the arm 11 extending inside the hollow "handle" portion of the housing 23, the light source 17 and detector 19 being located at the outermost end of this "handle" portion, in close proximity to the free end 14 of the arm 11, and the enlarged "head" portion of the housing 23 accommodating the various, relatively bulky, electronics 21.

The portion of the arm 11 outside the conduit 6, notably the free end 14, is isolated from the interior of the conduit 6 by means of a flexible sealing element, in the form of bellows 25, to effectively seal off the interior of the handle portion of the housing 23 from the interior of the conduit 6. In FIG. 1, the bellows 25 seals against the arm 11 and the housing 23, but alternatively the sealing element could engage the arm 11 and the wall of the conduit 6 around the aperture.

In use, fluid flows into the conduit through the inlet 6a and, depending upon the rate of flow of fluid within the pipeline, a force will be exerted on the plug 7 by the fluid, in the direction of flow A. This force causes the plug 7 to axially slide on the shaft 8 and, via the action of the spring 15, deflects the arm 11 from its default position shown in FIG. 1, in an anti-clockwise sense about the flexure point 12. At the same time the arm 11, principally at the flexure point 12, resists axial movement of the plug 7. Therefore, for steady flow, the plug 7 will reach an equilibrium position, whereby the arm 11 will have been deflected by a certain amount from its initial default position (shown in FIG. 1). The degree of axial movement of the plug 7 in the equilibrium position will be related to the mass flow rate through the conduit, and the degree of deflection of the arm 11 is in turn related to the degree of axial movement of the plug 7. The degree of deflection of the arm 11 can thus be linked to the mass flow rate through the pipeline.

The amount of deflection of the arm 11 is determined by the optical sensor arrangement. Thus, deflection of the free end 14 of the arm 11 proportionally changes the angle of incidence between the incident beam 18 and the mirror 16 and the detector 19 effectively measures this change by detecting the change in position of the reflected beam 20, at the detector 19, relative to some reference position corresponding to the initial position of the arm 11.

The signal or signals from the detector are fed to the processor 22, which converts them into signals representing flow rate, for example mass flow rate, according to a predetermined algorithm. Suitable conventional signal amplification and conditioning can be carried out as appropriate.

In the embodiment described, the cone-shaped plug 7 preferably has a particular configuration which is designed such that there is a linear relationship between the flow rate within the conduit 6 and the amount of deflection of the arm 11.

The flow meter 1 may incorporate a suitable temperature sensor and/or pressure sensor, such as a Platinum Resistance Thermometer (PRT), for deriving the true mass flow rate, including flow rate compensations or corrections such as density compensation.

In the event of excess flow through the steam pipeline, the stop 10 provides an abutment for the plug 7.

It will be appreciated that in FIG. 1, the sensor arrangement measures deflection of the arm 11 at a point on the opposite side of the applied load to the flexure point 12. Thus, the degree of deflection measured by the sensor arrangement is necessarily greater than the degree of deflection of the arm 11 at the point of the applied load (ie the load applied by the plug 7); this mechanical advantage tends to reduce the percentage error in the measured deflection and, it is envisaged, may also provide a quicker meter-response time.

In the prior art flow meter designs initially described above i.e. utilising a strain bridge to determine the force exerted on the target element, the strain bridge is desirably located near the fixed end of the radial support element, which will typically experience the greatest induced strain. However, in order to isolate the relatively delicate strain bridge from the internal pressure within the conduit, the fixed end of the radial support element is isolated outside the conduit and the free, deflecting end of the radial support element is positioned inside the conduit.

A problem with this prior art arrangement is that the consequent static differential pressure between the free end of the radial support element (inside the conduit) and the fixed end of the radial support element (isolated outside the conduit) results in a net compressive or bending force on the radial support element. The consequent induced strain due to this compressive or bending force is measured by the strain bridge and must therefore be compensated for, in any flow rate calculation, typically on the basis of a separate pressure measurement. The requirement for such compensation tends to increase the cost and complexity of the design, particularly for flow metering of liquids such as water (used in flow meter calibration), where the density of the liquid is mostly a function of temperature, so that pressure measurements may not be required for density compensation.

In contrast, by measuring the deflection of the arm according to the present invention, and linking the calculation of the flow rate to the measured deflection rather than to a measurement of induced strain in the arm, this design constraint on the location of the fixed end of the arm is removed, providing greater design freedom in the positioning of the arm.

Thus, the free end of the arm can conveniently be isolated outside the conduit, for example as shown in FIG. 1, thereby isolating the free end of the arm from the significant static fluid pressure in the conduit, which might otherwise tend to compress or bend the arm if it acted on the free end of the arm. In this manner, it is envisaged that the need to provide a separate pressure measurement for compensation purposes can be obviated, because the static pressure outside the conduit will of itself be insufficient to cause any significant deflection of the arm. At the same time, the arm is relatively free to deflect in response to axial displacement of the target element.

Although in the embodiment described, the arm 11 is flexible and secured to the conduit at a flexure point 12, the arm could alternatively be rigid and the anchor point may be a pivot point for the arm. In this case, the arm can be viewed as a mechanically advantageous third-class lever, with the "fulcrum" of the lever being the pivot point of the arm and the input load being the load applied by the respective target element to produce the measured deflection (on the opposite side of the load from the fulcrum).

The flow meter according to the present invention may be used for various fluids, including liquids, steam, oil or gas, and provides for convenient re-calibration using a liquid such as water.

It is further envisaged that the flow meter according to the present invention provides a design that can be readily scaled to accommodate any cross-section of pipeline.

The invention claimed is:

1. A flow meter for monitoring fluid flow comprising:
a conduit having a fluid inlet and a fluid outlet configured to be in communication with respective sections of a pipeline;
a target element positioned inside the conduit between, with respect to a first axis, the fluid inlet and the fluid outlet, the target element being mounted for resilient axial displacement with respect to the first axis under a pressure differential between the inlet and the outlet;
an arm secured at an anchor point on one side of the conduit and extending radially across the conduit along a second axis that is transverse to the axis, the target element being coupled to the arm for applying a load to the arm, upon said axial displacement of the target element, so as to deflect the arm relative to the anchor point, wherein the target element is located, respective to the second axis, between the anchor point and a deflection measurement point; measurement point;
a sensor arrangement configured to measure deflection of the arm at the deflection measurement point; and
a processor configured to provide a signal representative of the fluid flow through the conduit in response to said measured deflection.

2. A flow meter according to claim 1, further comprising a resilient biasing member configured to act between the target element and the arm.

3. A flow meter according to claim 1, wherein the arm is flexible and the anchor point is a flexure point.

4. A flow meter according to claim 1, wherein the arm extends through an aperture in the wall of the conduit and has a free end located outside the conduit.

5. A flow meter according to claim 4, wherein the free end of the arm is isolated from the internal pressure in the conduit by a flexible sealing element providing a flexible seal around the arm.

6. A flow meter according to claim 4, wherein the sensor arrangement is located externally of the conduit, in proximity to the free end of the arm.

7. A flow meter according to claim 1, wherein the sensor arrangement is an optical sensor arrangement.

8. A flow meter according to claim 7, wherein the optical sensor arrangement comprises:
a reflecting element fixed to the arm;
a light source configured to direct an incident beam of light onto the surface of the reflecting element;
and a light detector configured to detect the position of the resulting reflected beam of light relative to a reference position.

9. A flow meter according to claim 1, wherein the target element is a plug having an axially-varying cross section, wherein axial displacement of the plug is configured to vary the flow cross section of the conduit.

10. A flow meter according to claim 9, wherein the axial profile of the plug is such that there is a linear relationship between said deflection of the arm and flow rate through the conduit.

11. A flow meter according to claim 10, wherein the plug is cone-shaped.

12. A flow meter according to claim 1, further comprising a stop for limiting axial displacement of the target element.

13. A flow meter according to claim 1, further comprising a sensor selected from the group consisting of:
a temperature sensor configured to provide temperature-based compensations or corrections, a pressure sensor configured to provide pressure-based compensations or corrections, and combinations thereof.

14. A flow meter for monitoring fluid flow comprising:
a conduit extending along a first axis having a fluid inlet configured to be in communication with a first section of a pipeline and a fluid outlet configured to be in communication with a second section of the pipeline;
a target element within the conduit configured to be mounted for resilient axial displacement, with respect to the first axis, under a pressure differential between the inlet and the outlet of the conduit;
an arm having a proximate end configured to be secured at an anchor point and extending radially across the conduit along a second axis that is transverse to the first axis towards a distal end of the arm, wherein the arm is further configured to be coupled to the target element to receive a load from the target element upon an axial displacement of the target element, so as to deflect the arm relative to the anchor point, wherein the target element is located, respective to the second axis, between the anchor point and a deflection measurement point;
a sensor arrangement configured to measure a deflection of the arm at the deflection measurement point; and
a processor configured to be in communication with a non-transitory computer-readable medium comprising computer-executable instructions that when executed by the processor performs at least:
providing a signal representative of the fluid flow through the conduit in response to said measured deflection of the arm.

15. A flow meter according to claim 14, further comprising a resilient biasing member configured to act between the target element and the arm.

16. A flow meter according to claim 14, wherein the arm extends through an aperture in the wall of the conduit and has a free end located outside the conduit.

17. A flow meter according to claim 16, wherein the anchor point is integral with a wall of the conduit and the point on the distal end of the arm is a terminus of the distal end.

18. A flow meter according to claim 17, wherein the sensor arrangement is located externally of the conduit in proximity to the terminus of the arm.

19. A flow meter according to claim 18, wherein the sensor arrangement comprises an optical sensor arrangement.

20. A flow meter according to claim 19, wherein the optical sensor arrangement comprises:
a reflecting element fixed to the arm;
a light source configured to direct an incident beam of light onto a surface of the reflecting element; and
a light detector configured to detect the position of the resulting reflected beam of light relative to a reference position.

* * * * *